May 21, 1968 T. J. GRENIER 3,384,824

PHASE QUADRATURE TRANSMISSION SYSTEM WITH RECEIVER DETECTORS CONTROLLED IN RESPONSE TO PRESENCE OF PILOT WAVES APPEARING AS CROSSTALK

Filed Dec. 14, 1965

INVENTOR
T. J. GRENIER
BY [signature]
ATTORNEY

United States Patent Office 3,384,824

Patented May 21, 1968

3,384,824

PHASE QUADRATURE TRANSMISSION SYSTEM WITH RECEIVER DETECTORS CONTROLLED IN RESPONSE TO PRESENCE OF PILOT WAVES APPEARING AS CROSSTALK

Thomas J. Grenier, Mine Hill, N.J., assignor to Bell Telephone Laboratories, Incorporated, New York, N.Y., a corporation of New York Filed Dec. 14, 1965, Ser. No. 513,776
4 Claims. (Cl. 325—49)

Figure 1:
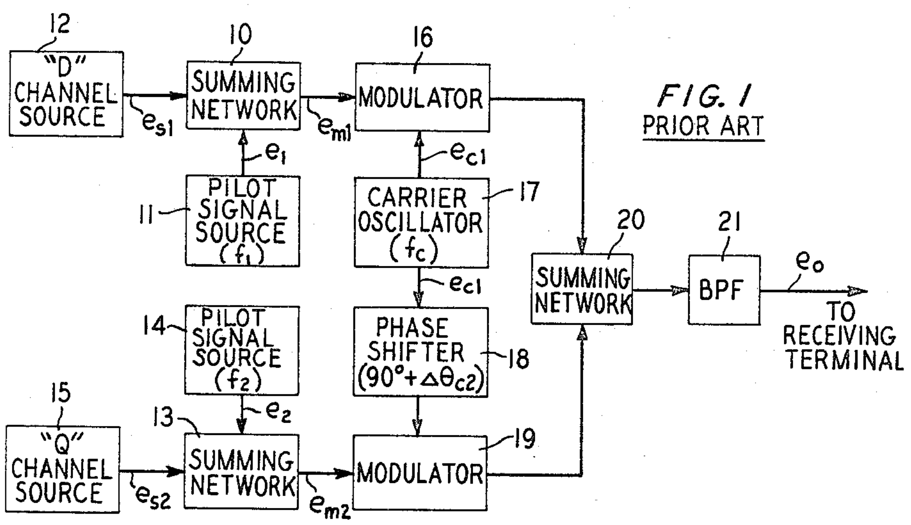
FIG. 1 PRIOR ART

This invention relates to multiplexing transmission systems using quadrature modulation.

Quadrature modulation systems conserve transmission bandwidth by transmitting a pair of amplitude modulated waves within the bandwidth of the modulated wave having the greater bandwidth. A typical system modulates each wave of a pair of quadraturely related carrier waves by a distinct modulating signal. The modulated waves are then linearly added and transmitted to a receiving terminal. At the receiving terminal, quadraturely related waves are produced and modulated with received waves to recover the original modulating signals.

Undesirable conditions exist in most quadrature modulation systems. First, carrier frequency waves are transmitted for synchronizing purposes. This uses some of the power handling capability of the transmission medium that could otherwise be used for signal modulated waves. Second and more importantly, crosstalk appearing in system outputs is often intolerable.

Crosstalk is produced in a quadrature modulation system when less than ideal phase relationships occur. Crosstalk occurs, for example, when transmitter and receiver carrier frequency waves are not correctly phased with respect to one another. Crosstalk also occurs when nonlinear delay versus frequency characteristics of transmission media produce phase shifts.

The relationship of crosstalk to phase errors is illustrated in FIG. 11–4 on page 177 of the textbook "Modulation Theory" by H. S. Black, published by D. Van Nostrand Company (1953). As indicated in this textbook, a crosstalk level in the order of minus 60 decibels occurs only under ideal conditions and at considerable expense. Crosstalk levels in all but one of the practical systems known to applicant are only in the order of minus 20 decibels, which is frequently unacceptable.

The only practical quadrature modulation system known to applicant which uses suppressed carrier modulation and produces receiving terminal outputs which are substantially free of crosstalk is disclosed in patent application Ser. No. 409,442 filed on Nov. 6, 1964, by J. F. Lynch. In accordance with a preferred embodiment of the Lynch invention, two pilot signals at unique frequencies are added to the transmitting terminal modulating signals, respectively. The composite signals then balance modulate a pair of quadraturely related carrier waves. At the receiving terminal, signals at the pilot frequencies control a pair of synchronous detectors to produce system outputs that are substantially crosstalk free.

Crosstalk in the outputs of the above-described Lynch system has been measured and found to have a separation in the order of minus 60 decibels. This separation is provided without having to provide exactly 90° of phase difference between the carrier waves at the transmitting or receiving terminals. This separation is also provided without having to provide a transmission medium having a linear delay versus frequency characteristic. Furthermore, this separation is maintained regardless of phase changes produced because of normal aging of the system components. All of this is accomplished because continuous compensation is provided for crosstalk occurring within the system. The system therefore provides a substantial improvement in output crosstalk without further refinements of existing equipment or further improvements in maintenance of the equipment.

An object of the present invention is to obtain all of the above advantages while using less apparatus than required in the above-described embodiment.

This and other objects are achieved by using only one instead of two synchronous detectors in the receiving terminal.

The present invention may be better appreciated by first briefly considering how the Lynch receiver operates. In that receiver, signals at the pilot frequencies control respective detector oscillators so that one output of each detector is substantially free of crosstalk. Crosstalk appearing in the remaining detector outputs is not of any consequence since these outputs are not used.

In accordance with the present invention, both outputs of the single synchronous detector are made substantially free of crosstalk so that they can be used as system outputs. As in the Lynch system, signals at one of the pilot frequencies control the detector oscillator to cause one of the detector's outputs to be substantially free of crosstalk. Unlike the earlier receiver, however, received signals at the other pilot frequency control the phase shift of the quadrature phase shifter to cause the other output of the detector to be substantially free of crosstalk. In other words, whereas the earlier receiver includes a pair of synchronous detectors each of which has a single controlled element, a receiver in accordance with the present invention includes a single synchronous detector having two controlled elements.

Other objects and features of the invention will become apparent from a study of the following detailed description of an illustrative embodiment.

Figure 2:
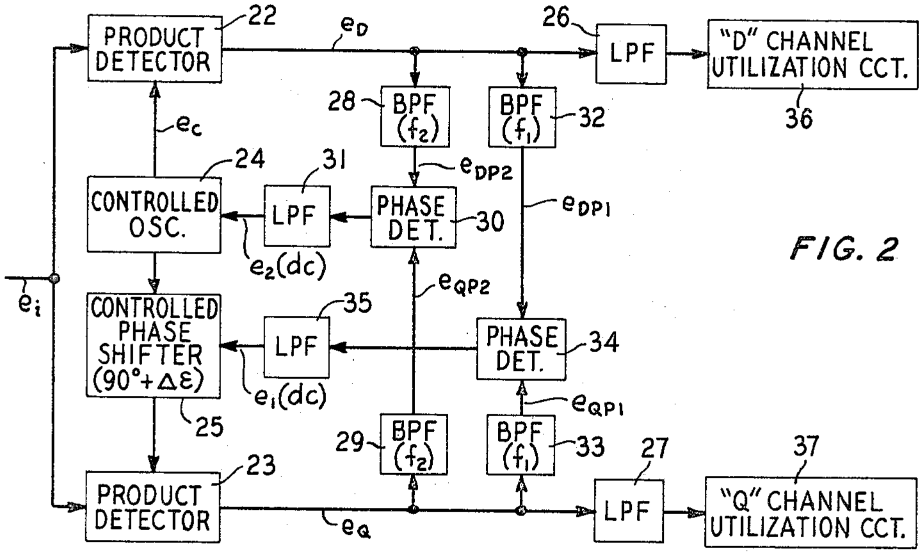
Figure 3:
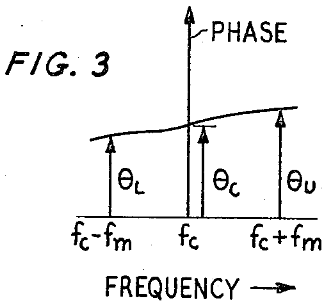

In the drawings:

FIG. 1 discloses a block diagram of the transmitting terminal of the preferred embodiment of the Lynch invention;

FIG. 2 discloses a block diagram of a receiving terminal embodying the invention; and FIG. 3 is a graphical representation of the phase shifting characteristics of a typical transmission medium.

FIG. 1 is a block diagram of the transmitting terminal of the preferred embodiment of the Lynch invention. It comprises a conventional quadrature modulation transmission terminal which has been modified so that distinct pilot signals are inserted in each of the two channels outside of their information bands. In particular, a summing network 10 adds a pilot signal $e_1$ (having a distinct frequency $f_1$) from a source 11 to an output $e_{s1}$ from a D channel source 12. Similarly, a summing network 13 adds a pilot signal $e_2$ (having a distinct frequency $f_2$) from a source 14 to an output $e_{s2}$ from a Q channel source 15. (The letters D and Q are used to indicate the directly and quadraturely modulated sides of the system.) An output $e_{m1}$ from summing network 10 is applied to an amplitude modulator 16 and modulates a carrier wave $e_{c1}$ (at a frequency $f_c$) from an oscillator 17. The same carrier wave shifted in phase by approximately 90° by a phase shifter 18 is modulated in an amplitude modulator 19 by an output $e_{m2}$ from summing network 13. A summing network 20 sums the outputs from modulators 16 and 19 and applies its output to a bandpass filter 21. Filter 21 passes substantially only the upper and lower sidebands of the modulator outputs. A double sideband suppressed carrier output $e_o$ from filter 21 is transmitted to the receiving terminal shown in FIG. 2.

A receiving terminal, in accordance with the invention, is disclosed in FIG. 2. It comprises a conventional synchronous detector which has been modified so that the frequency of the local oscillator is controlled in response to signals only at pilot signal frequency $f_2$ while the phase shift of the quadrature phase shifter is controlled in response to signals only at pilot signal frequency $f_1$. (A simplified discussion and diagram of the conventional synchronous detector appears on page 40 of the August, 1964 issue of Electronics World.)

The synchronous detector comprises a pair of product detectors 22 and 23 to which signals received from the transmitting terminal are applied. The output of a controlled oscillator 24 is applied directly to product detector 22, while the same output phase shifted by approximately 90° by a phase shifter 25 is applied to product detector 23. The higher frequency components in the outputs of detectors 22 and 23 are suppressed by low-pass filters 26 and 27, respectively, before being applied to output circuits.

A pair of filters 28 and 29, which have narrow band-pass characteristics centered at the frequency $f_2$, pass substantially only $f_2$ frequency signals in the outputs of detectors 22 and 23, respectively. The outputs from filters 28 and 29 are modulated in a phase detector 30. A low-pass filter 31 passes substantially only the direct current component in the output of detector 30 and applies this component as a control voltage to oscillator 24. As will become apparent from a subsequent detailed discussion, the control signal applied to oscillator 24 causes the phase of the oscillator output to be of a nature to minimize the output from filter 28.

A pair of filters 32 and 33, which have narrow band-pass characteristics centered at the frequency $f_1$, pass substantially only $f_1$ frequency signals in the outputs of detectors 22 and 23, respectively. The outputs from filters 32 and 33 are modulated in a phase detector 34. A low-pass filter 35 passes substantially only the direct current component in the output of detector 34 and applies this component to phase shifter 25 to control the phase of its output in a manner to minimize the output from filter 33.

The outputs of filters 26 and 27 are applied to a D channel utilization circuit 36 and a Q channel utilization circuit 37.

The manner in which the system of FIGS. 1 and 2 operates to provide a crosstalk separation in the order of minus 60 decibels is now explained. Although an attempt has been made to keep this explanation as simple as possible, it is still relatively detailed. The primary reason for this detail is that an attempt has been made to include all potential sources of phase shift in order to demonstrate the full effectiveness of the invention.

Let the inputs to modulators 16 and 19 of FIG. 1 be represented by:

$$e_{m1}=E_{m1}\cos\omega_{m1}t \tag{1}$$

and $$e_{m2}=E_{m2}\cos\omega_{m2}t \tag{2}$$

respectively.

(Note that $e_{m1}$ and $e_{m2}$ include the input signals $e_{s1}$ and $e_{s2}$ at frequencies $f_{s1}$ and $f_{s2}$ and the pilot signals at frequencies $f_1$ and $f_2$.) The double sideband suppressed carrier output of filter 21 is then:

$$e_o=\frac{E_{m1}E_{c1}}{2}(\cos[\omega_ct+\theta_{c1}+\omega_{m1}t]+\cos]\omega_ct+\theta_{c1}-\omega_{m1}t])$$
$$+\frac{E_{m2}E_{c1}}{2}(\sin[\omega_ct+\theta_{c1}+\Delta\theta_{c2}+\omega_{m2}t]+\sin[\omega_ct+\theta_{c1}+\Delta\theta_{c2}-\omega_{m2}t]) \tag{3}$$

where:

$\omega_c$=angular frequency of the carrier wave,
$\theta_{c1}$=arbitrary phase of the carrier wave and
$\Delta\theta_{c2}$=phase error in 90° shifter 18.

The output of the transmitting terminal is transmitted over a transmission medium which is assumed to have an arbitrary phase characteristic as shown in FIG. 3. This characteristic may be expressed through the use of a Taylor series about the frequency $f_c$ (see FIG. 3). Such a treatment results in:

$$\theta_U=\theta(f_c)+a_1f_m+a_2f_m^2+a_3f_m^3+\ldots$$

and $$\theta_L=\theta(f_c)-a_1f_m+a_2f_m^2-a_3f_m^3+\ldots$$

where $\theta_U$ and $\theta_L$ are the upper and lower sideband phase shifts, respectively, produced by the transmission medium. When the above is expressed in a simpler form, the result is:

$$\theta_U=\theta_c+\theta_e+\theta_o \tag{4}$$

and $$\theta_L=\theta_c+\theta_e-\theta_o \tag{5}$$

where:

$\theta_c=\theta(f_c)$ $\theta_e=\sum_{N=1}a_{2N}f_m^{2N}$ (even order contributions to phase)

and $\theta_o=\sum_{N=1}a_{2N-1}f_m^{2N-1}$ (odd order contributions to phase)

The input to the receiving terminal is of the form:

$$\begin{aligned}e_1=K_1(&\cos[\omega_ct+\theta_{c1}+\theta_U+\omega_{m1}t]\\&+\cos[\omega_ct+\theta_{c1}+\theta_L-\omega_{m1}t])\\&+K_2(\sin[\omega_ct+\theta_{c1}+\theta_U+\Delta\theta_{c2}+\omega_{m2}t]\\&+\sin[\omega_ct+\theta_{c1}+\theta_L+\Delta\theta_{c2}-\omega_{m2}t])\end{aligned} \tag{6}$$

When the appropriate values from Equations 4 and 5 are substituted in Equation 6, the phase angle $\theta_c$ is common to each part of the equation. Furthermore, the phase angle $\theta_{c1}$ is common to each part of the equation. These common angles can be dropped without affecting the final results. Equation 6 therefore becomes:

$$\begin{aligned}e_1=K_1(&\cos[\omega_ct+\theta_e+\theta_o+\omega_{m1}t])\\&+(\cos[\omega_ct+\theta_e-\theta_o-\omega_{m1}t])\\&+K_2(\sin[\omega_ct+\theta_e+\theta_o+\Delta\theta_{c2}+\omega_{m2}t]\\&+\sin[\omega_ct+\theta_e-\theta_o+\Delta\theta_{c2}-\omega_{m2}t])\end{aligned} \tag{7}$$

The output of controlled oscillator 24 is of the form:

$$e_c=E_c\cos[\omega_ct+\Delta\psi] \tag{8}$$

where $\Delta\psi$=phase difference between the output of oscillator 24 and what would be the received carrier waves if the quadrature carrier waves were not suppressed at the transmitter.

The outputs of detectors 22 and 23 at the $\omega_{m1}$ and $\omega_{m2}$ angular frequencies are:

$$\begin{aligned}e_D=&E_cK_1\cos(\Delta\psi-\theta_e)\cos(\omega_{m1}t+\theta_o)\\&+E_cK_2\sin(\theta_e+\Delta\theta_{c2}-\Delta\psi)\cos(\omega_{m2}t+\theta_o)\end{aligned} \tag{9}$$

and $$\begin{aligned}e_Q=&E_cK_1\sin(\Delta\psi+\Delta\epsilon-\theta_e)\cos(\omega_{m1}t+\theta_o)\\&+E_cK_2\cos(\Delta\psi+\Delta\epsilon-\theta_e-\Delta\theta_{c2})\cos(\omega_{m2}t+\theta_o)\end{aligned} \tag{10}$$

respectively, where $\Delta\epsilon$=difference between 90° and the actual phase shift produced by phase shifter 25.

The first halves of Equations 9 and 10 include signals at frequencies $f_{s1}$ and $f_1$ while the second halves include signals at frequencies $f_{s2}$ and $f_2$. The $f_{s1}$ and $f_{s2}$ signals are passed to (while the $f_1$ and $f_2$ signals are blocked from) utilization circuits 36 and 37 by filters 26 and 27. The $f_{s2}$ signals passed to utilization circuit 36 are, however, undesired crosstalk. The $f_{s1}$ signals passed to utilization circuit 37 are also undesirable crosstalk. In other words, the second half of Equation 9 and the first half of Equation 10 include the undesired crosstalk. Such crosstalk is zero when:

$$\Delta\psi=\theta_{es2}+\Delta\theta_{c2} \tag{11}$$

and $$\Delta\epsilon=\theta_{es1}-\Delta\psi \tag{12}$$

where $\theta_{es1}$ and $\theta_{es2}$ are the even order contributions to transmission line phase shifts experienced by the $f_{s1}$ and $f_{s2}$ signals.

As mentioned above, Equations 9 and 10 include signals at the pilot frequencies $f_1$ and $f_2$. These signals are:

$$e_{DP}=E_c k_1 \cos(\Delta\psi-\theta_{e1}) \cos(\omega_1 t+\theta_{o1}) + E_c k_2 \sin(\theta_e+\Delta\theta_{c2}-\Delta\psi) \cos(\omega_2 t+\theta_{o2}) \quad (13)$$

and $$e_{QP}=E_c k_1 \sin(\Delta\psi+\Delta\epsilon-\theta_{e1}) \cos(\omega_1 t+\theta_{o1}) + E_c k_2 \cos(\Delta\psi+\Delta\epsilon-\theta_{e2}-\Delta\theta_{c2}) \cos(\omega_2 t+\theta_{o2}) \quad (14)$$

where:

$\omega_1$ and $\omega_2$ are the angular frequencies of the pilot signals,
$\theta_{e1}$ and $\theta_{o1}$ are the even and odd order contributions to transmission line phase shift experienced by the $f_1$ pilot frequency signals and
$\theta_{e2}$ and $\theta_{o2}$ are the even and odd order contributions to transmission line phase shift experienced by the $f_2$ pilot frequency signals.

Waves represented by the second halves of Equations 13 and 14 are applied to phase detector 30. The direct current component of the output of detector 30 is of the form:

$$e_2(dc)=\left(\frac{E_c k_2}{2}\right)^2 \{\sin(2[\Delta\theta_{c2}+\theta_{c2}-\Delta\psi]-\Delta\epsilon)+\sin(\Delta\epsilon)\} \quad (15)$$

Oscillator 24 is initially adjusted so that this voltage is substantially zero; the feedback arrangement then controls oscillator 24 to maintain the voltage at a substantially zero level. In particular, voltage $e_2$ controls the frequency and consequently the phase of oscillator 24 so that the following is substantially achieved:

$$\Delta\psi=(\theta_{e2}+\Delta\theta_{c2}) \quad (16)$$

Waves represented by the first halves of Equations 13 and 14 are applied to phase detector 34. The direct current component of the output of detector 34 is of the form:

$$e_1(dc)=\left(\frac{E_c k_1}{2}\right)^2 \{\sin(2[\Delta\psi-\theta_{e1}]+\Delta\epsilon)+\sin\Delta\epsilon\} \quad (17)$$

Phase shifter 24 is initially adjusted so that this voltage is substantially zero; the feedback arrangement then controls phase shifter 25 to maintain the voltage at a substantially zero level. In particular, voltage $e_1$ controls the phase angle $\Delta\epsilon$ so that the following is substantially achieved:

$$\Delta\epsilon=\theta_{e1}-\Delta\psi \quad (18)$$

The above results may now be used to calculate the crosstalk in the outputs of the detector. With reference to Equation 9, it was previously stated that the $f_{s2}$ signals in the second term represent the crosstalk from the Q channel to the D channel. This crosstalk can be expressed in decibels by placing the $f_{s2}$ signal portion of the second term of this equation over the $f_{s2}$ signal portion of the second term of Equation 10. When this is done, the result is:

$$\text{Crosstalk}=\frac{\sin[\theta_{es2}+\Delta\theta_{c2}-\Delta\psi]}{\cos[\Delta\psi+\Delta\epsilon-\theta_{es2}-\Delta\theta_{c2}]} \quad (19)$$

where $\theta_{es2}$ is the even order component of transmission line phase shift experienced by the $f_{s2}$ signal.

Using the values from Equations 16 and 18 produces:

$$\text{Crosstalk}=\frac{\sin[\theta_{es2}-\theta_{e2}]}{\cos[\theta_{e1}-\theta_{es2}-\Delta\theta_{c2}]} \quad (20)$$

The expression for the Q channel crosstalk is similarly obtained through the use of Equations 9, 10, 16 and 18. The result is:

$$\text{Crosstalk}=\frac{\sin[\theta_{e1}-\theta_{es1}]}{\cos[\theta_{e2}-\theta_{es1}+\Delta\theta_{c2}]} \quad (21)$$

From Equations 20 and 21 it is seen that the basic contribution to crosstalk in the outputs is caused by a departure in the even-order contribution to phase of the transmission medium. (Although crosstalk is also a function of $\Delta\theta_{c2}$, a value of $\Delta\theta_{c2}$ in the order of 10° contributes little to crosstalk because $\Delta\theta_{c2}$ is a part of a cosine argument which is close to zero degrees.) In other words, crosstalk is produced only because the even-order contributions for all possible values of frequency $f_{s1}$ are not the same as those for frequency $f_1$ and, similarly, the even-order contributions for all possible values of frequency $f_{s2}$ are not the same as those for frequency $f_2$. For a crosstalk margin of 60 decibels, the maximum differences between $\theta_{es2}$ and $\theta_{e2}$ and between $\theta_{es1}$ and $\theta_{e1}$ are approximately one-twentieth of a degree. Transmission media having such a characteristic are readily obtainable.

As mentioned previously, an attempt has been made in the above explanation to include all potential sources of phase shift that result in crosstalk in conventional quadrature modulation systems. The explanation demonstrates that the disclosed embodiment provides automatic compensation for all but two of such phase shifts. One of these two phase shifts is the error $\Delta\theta_{c2}$ introduced by phase shifter 18 of the transmitting terminal. As already discussed, this error appears in the crosstalk expression as a part of the argument of a cosine function. As this error is readily maintainable below 10°, its contribution to crosstalk is negligible.

The other of the two phase shifts is the *difference* in the phase departures of an information signal and a pilot signal due to the even-order contributions to phase shifts by the transmission medium. As this *difference* does not exceed one-twentieth of a degree over many transmission media, crosstalk separation in the order of 60 decibels is readily achieved.

From the above discussion, it is believed apparent that the disclosed embodiment of the present invention offers a reduction in components over those used in the Lynch system. In particular, two product detectors, one controlled oscillator and one fixed phase shifter have been eliminated while the remaining phase shifter has been rendered controllable. The latter is readily achieved by adding a varactor diode so that the phase shift $\Delta\epsilon$ is provided in response to control voltage $e_1(dc)$. A substantial saving in components is therefore effected.

Although several specific embodiments of the invention have been described, various other embodiments may be devised by those skilled in the art without departing from the spirit and scope of the invention.

What is claimed is:

1. In a suppressed carrier quadrature modulation system having a pilot signal at a first frequency in its direct channel and a pilot signal at a second frequency in its quadraturely related channel, a receiver comprising
controllable means generating a pair of nominally quadraturely related waves,
first and second modulating means modulating said quadraturely related waves, respectively, with input signals to said receiver to produce first and second outputs, respectively,
means responsive to signals at said second frequency from at least one of said outputs to control the frequency of said quadraturely related waves to reduce to a minimum level said second frequency signals in said first output,
means responsive to signals at said first frequency from at least one of said outputs to control the phase difference between said quadraturely related waves to reduce to a minimum level said first frequency signal in said second output,
output terminals, and
means connecting said output terminals to said first and second modulating means.

2. In a suppressed carrier quadrature modulation system having a pilot signal at a first frequency in its direct channel and a pilot signal at a second frequency in its quadraturely related channel, a receiver comprising
controllable means generating a pair of nominally quadraturely related waves,
first and second modulating means modulating said quadraturely related waves, respectively, with input signals to said receiver to produce first and second outputs, respectively,
means recovering signals at said second frequency from each of said first and second outputs,
third modulating means modulating said second frequency recovered signals,
means applying the direct current component output of said third modulating means to said controllable means to control the frequency of its output waves to reduce to a minimum level said direct current component,
means recovering signals at said first frequency from each of said first and second outputs,
fourth modulating means modulating said first frequency recovered signals,
means applying the direct current component of said fourth modulating means to said controllable means to control the phase difference between its output waves to reduce to a minimum level said direct current component of said fourth modulating means,
output terminals, and
means connecting said output terminals to said first and second modulating means.

3. In a suppressed carrier quadrature modulation system having a first distinct frequency pilot signal in its direct channel and a second distinct frequency pilot signal in its quadraturely related channel, a receiver comprising
a controllable oscillator,
a controllable phase shifter connected to said oscillator and producing approximately 90° of phase shift,
first and second modulating means modulating the outputs from said oscillator and said phase shifter with input signals to said receiver, respectively, to produce first and second outputs, respectively,
means recovering signals at said second frequency from each of said first and second outputs,
third modulating means modulating said second frequency recovered signals,
means applying the direct current component output of said third modulating means to said controllable means to control the frequency of its output waves to reduce to a minimum level said direct current component,
means recovering signals at said first frequency from each of said first and second outputs,
fourth modulating means modulating said first frequency recovered signals,
means applying the direct current component of said fourth modulating means to said controllable means to control the phase difference between its output waves to reduce to a minimum level said direct current component of said fourth modulating means,
output terminals, and
means connecting said output terminals to said first and second modulating means.

4. A combination of transmitter and receiver for quadrature modulation transmission,
said transmitter comprising
a source of substantially quadraturely related carrier waves,
a pair of balanced modulators,
means connecting said carrier waves source to said modulators to apply said quadraturely related carrier waves to said modulators, respectively,
two sources of intelligence waves,
means connecting said sources of intelligence waves to said modulators, respectively,
means connected to the last-mentioned means to linearly add pilot-signal waves at first and second frequencies to said intelligence waves, respectively,
means connected to said modulators to linearly combine the modulator outputs, and
means connected to said combining means to transmit the combined modulator outputs; and
said receiver comprising
a second source of substantially quadraturely related waves,
first and second modulating means modulating said second quadraturely related waves with input signals to said receiver, respectively, to produce first and second outputs,
means responsive to second frequency signals in said outputs to control the frequency of said second quadraturely related waves to reduce to a minimum level said second frequency signal in said first output,
means responsive to first frequency signals in said outputs to control the phase difference between said second quadraturely related waves to reduce to a minimum level said first frequency signal in said second output,
output terminals, and
means connecting said output terminals to said first and second modulating means.

References Cited

UNITED STATES PATENTS 3,289,082 11/1966 Shumate ---------- 325—60 X

OTHER REFERENCES

Electronic Engineering, May 1948, pp. 150–151, "A Two-Phase Telecommunication System," by D. G. Tucker.

ROBERT L. GRIFFIN, *Primary Examiner.*

B. V. SAFOUREK, *Assistant Examiner.*